United States Patent
Bongaarts et al.

(10) Patent No.: US 11,382,018 B2
(45) Date of Patent: Jul. 5, 2022

(54) WIRELESS HANDOVERS BASED ON DEVICE MOVEMENT

(71) Applicant: T-Mobile USA, Inc., Bellevue, WA (US)

(72) Inventors: Paul Bongaarts, Issaquah, WA (US); Egil Gronstad, Encinitas, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/661,354

(22) Filed: Jul. 27, 2017

(65) Prior Publication Data

US 2019/0037468 A1 Jan. 31, 2019

(51) Int. Cl.
*H04W 36/32* (2009.01)
*H04W 36/04* (2009.01)
*H04W 36/08* (2009.01)
*H04W 36/30* (2009.01)
*H04W 88/02* (2009.01)

(52) U.S. Cl.
CPC ............ *H04W 36/32* (2013.01); *H04W 36/04* (2013.01); *H04W 36/08* (2013.01); *H04W 36/30* (2013.01); *H04W 88/02* (2013.01)

(58) Field of Classification Search
CPC ..... H04W 36/32; H04W 36/30; H04W 36/04; H04W 36/08; H04W 88/02
USPC ........................................................ 370/331
See application file for complete search history.

(56) References Cited

U.S. PATENT DOCUMENTS 9,497,745 B2 * 11/2016 Comeau ............... H04W 72/042
9,578,583 B2     2/2017 Lai et al.
10,080,167 B2 * 9/2018 Jung ................. H04W 36/0083
(Continued)

FOREIGN PATENT DOCUMENTS

EP        2642793 A1     9/2013

OTHER PUBLICATIONS

IEEE: Efficient and Prompt Handover in LTE-based Systems by Predicting the Target eNodeBs; Xianda Chen, Min Jae Kim, Sang Hyun Yoo, Na Young Park, Hee Yong Youn College of Information & Communication Engineering Sungkyunkwan University, Suwon, Korea, 2014. (Year: 2014).*

(Continued)

*Primary Examiner* — Hassan A Phillips
*Assistant Examiner* — Mohammed S Chowdhury
(74) *Attorney, Agent, or Firm* — Lee & Hayes, P.C.

(57) ABSTRACT

Systems, devices, and techniques described herein are directed to improved wireless handovers based on device movement. User equipment (UE) can be wirelessly connected to a network via a serving cell, while handover operations allow the UE to transition a connection from the serving cell to a candidate cell to facilitate mobility and connection continuity. In some cases, the serving cell can be a wide area network and the candidate cell can be a small cell, whereby the small cell utilizes millimeter wavelength communications. In some cases, where a candidate cell can provide a higher quality connection compared to the serving cell, a handover decision can be based at least in part on motion data associated with the UE. For example, if a speed of the UE is above a threshold, the UE or network can be prevented from initiating a handover from the serving cell to the candidate cell.

16 Claims, 5 Drawing Sheets

(56) References Cited

U.S. PATENT DOCUMENTS

| | | | |
|---|---|---|---|
| 2008/0261597 A1* | 10/2008 | Hayama | H04W 36/30 455/436 |
| 2009/0247162 A1* | 10/2009 | Yasuoka | H04W 36/32 455/436 |
| 2012/0052899 A1* | 3/2012 | Wang | H04W 52/226 455/513 |
| 2013/0023302 A1 | 1/2013 | Sivanesan | |
| 2014/0066074 A1 | 3/2014 | Folke et al. | |
| 2015/0011224 A1* | 1/2015 | Kompalli Chakravartula | H04W 36/0083 455/438 |
| 2015/0111594 A1 | 4/2015 | Cui et al. | |
| 2015/0119039 A1* | 4/2015 | Virtej | H04W 24/10 455/436 |
| 2015/0126193 A1* | 5/2015 | Huang | H04W 36/22 455/436 |
| 2015/0181481 A1* | 6/2015 | Masini | H04W 36/0083 455/436 |
| 2015/0181502 A1* | 6/2015 | Hans | H04W 40/22 455/437 |
| 2015/0233718 A1* | 8/2015 | Grokop | G01C 21/165 701/501 |
| 2015/0304928 A1* | 10/2015 | Lu | H04W 36/32 455/437 |
| 2015/0334625 A1* | 11/2015 | Banks | H04W 36/08 455/440 |
| 2016/0066252 A1* | 3/2016 | Parron | H04W 48/16 455/434 |
| 2016/0360537 A1* | 12/2016 | Palenius | H04W 24/10 |
| 2017/0099624 A1* | 4/2017 | Baghel | H04W 4/70 |
| 2017/0118690 A1* | 4/2017 | Patel | H04W 36/00837 |
| 2017/0127320 A1* | 5/2017 | Mok | H04W 36/32 |
| 2017/0150415 A1 | 5/2017 | Kapoulas et al. | |
| 2017/0171793 A1 | 6/2017 | Hamilton et al. | |
| 2018/0042000 A1* | 2/2018 | Zhang | H04B 7/04 |
| 2018/0049078 A1* | 2/2018 | Yang | H04W 36/00837 |
| 2018/0332507 A1* | 11/2018 | Fujishiro | H04J 11/00 |
| 2019/0223229 A1* | 7/2019 | Sharma | H04W 76/10 |
| 2020/0382941 A1* | 12/2020 | Lee | H04W 28/065 |

OTHER PUBLICATIONS

IEEE: Mobility Management for Femtocells in LTE-Advanced: Key Aspects and Survey of Handover Decision Algorithms; Dionysis Xenakis, Nikos Passas, Lazaros Merakos, and Christos Verikoukis, 2014. (Year: 2014).*

PCT Search Report and Written Opinion dated Oct. 29, 2018, for PCT Application No. PCT/US18/42814, 12 pages.

Extended European Search Report dated Mar. 25, 2021 for European Patent Application No. 18837859.0, 10 pages.

Chinese Office Action dated Sep. 1, 2021 for Chinese Application No. 201880048786.0, a foreign counterpart to U.S. Appl. No. 15/661,354, 11 pages.

* cited by examiner

WIRELESS HANDOVERS BASED ON DEVICE MOVEMENT

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The second, third, and forth generation technologies have utilized wireless frequencies on the order of 700-2500 MHz, resulting in wavelengths on the order of 42-12 cm, respectively. In general, terrestrial networks using lower frequencies provide coverage over a larger area, while higher frequencies provide coverage over a smaller area. Moving forward, future telecommunications systems may include 5G cellular-wireless access technologies utilizing frequencies on the order of 30-300 GHz, resulting in wavelengths on the order of 10-1 mm, respectively. Such 5G systems utilizing millimeter waves can provide high bandwidth communications; however, such millimeter waves can be blocked by buildings or absorbed by vegetation, rain, or clouds, potentially resulting in uneven wireless coverage, reduced call quality, or dropped calls.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to improved wireless handovers based on device movement. For example, a user equipment can be connected to a network via a wireless connection provided by a serving cell, whereby a cell represents wireless coverage provided by a base station. As the user equipment (UE) moves in geographical space, the UE is exposed to other cells, which can also provide connectivity to the network. In some cases, as the UE moves between cells, a handover can occur, whereby a wireless connection is moved from the serving cell to a candidate cell. In some cases, the serving cell can be a wide area network (WAN) providing a first wireless signal at a first frequency, and the candidate cell can be a small cell providing a second wireless signal at a second frequency. In some cases, the second frequency can be significantly higher than the first frequency, and/or a geographic footprint of the small cell can be smaller relative to the geographic footprint of the WAN. For example, the small cell can be a 5G base station capable of transmitting and receiving millimeter wavelength wireless communications. In some cases, as when the UE is moving above a threshold speed relative to the serving cell and/or relative to the candidate cell, the handover event (e.g., the decision whether to handover or not to handover, also referred to as a handover decision) can be based at least in part on motion data associated with the UE.

For example, when the UE is moving above a threshold speed, the handover from a WAN to the small cell can be prevented from occurring. In some cases, a call quality or signal strength provided by the candidate cell can be higher than a call quality or signal strength provided by the serving cell. Nevertheless, if a speed of the UE is above the threshold speed, for example, the handover event can be prevented from occurring, and the UE can remain connected to the WAN. In some instances, for example, when the WAN is no longer an option to function as a serving cell, the handover event can occur regardless of the speed of the UE being above the threshold speed.

Handover decisions can be made by the UE, by a base station (e.g., the serving cell, the candidate cell, and/or a network device), or by a combination of devices. Further, motion data associated with a UE can be determined by the UE or determined by a network device. Accordingly, motion data can be determined by the UE and utilized by the UE or provided by the UE to a base station, or can be determined by the base station and utilized by the base station in determining a handover event. For example, the UE can include one or more sensors such as accelerometers or GPS sensors that can determine motion of the UE. The UE can further determine motion data of the UE by evaluating when communications from various candidate cells are exposed to the UE, based on a known or inferred topology of the network. Further, when available, the UE and/or base station can estimate motion of the UE based at least in part on a timing advance analysis of connections established between the UE and base station(s).

In some instances, motion data of the UE can be inferred by a number of handover requests received over time. For example, a UE can handover from a first WAN into a first small cell, followed by a handover from the first small cell to a second small cell or a second WAN. In some cases, if a time period between the first handover and the second handover is below a threshold amount of time, or there are a number of handovers above a threshold number of handovers associated with a time period, the operations can cause the UE to handover to a WAN and remain connected to the WAN instead of subsequently initiating handovers to other small cells, where available and when applicable.

In some instances, a speed threshold (and accordingly, handover decisions) can be based at least in part on the speed of a UE in a candidate cell (e.g., a small cell) and the size of the candidate cell. For example, if a first candidate cell is relatively large, a speed threshold associated with the handover decision can be relatively higher than a second candidate cell that is smaller than the first candidate cell. In some instances, size information of a candidate cell can be provided to a UE in connection with identifying the candidate cell to the UE. In some instances, a candidate cell can be identified (e.g., as a parameter transmitted to the UE) as a cell where motion data can be considered in handover decisions. In some examples, the speed threshold can be based on a variety of factors, as discussed herein.

In some instances, the handover decision can be based at least in part on historical motion data. For example, if a UE is in a vehicle that is navigating through a candidate cell (e.g., a small cell) and the speed of the vehicle decreases (e.g., when the vehicle comes to a stop light), the operations can determine to initiate (or prevent) a handover event based at least in part on motion data over a period of time. For example, even if an instantaneous speed is below a threshold speed, an average speed can be above a threshold average speed, in which case, the handover event can be prevented from being initiated. In some instances, motion data can include instantaneous speed information, average speed information, and/or route information (e.g., associated with a navigation application operating on the UE). Thus, the handover decision can be based on speed information (e.g., instantaneous, average, etc.) and/or route information, and a handover event can be prevented even in a case where an instantaneous speed is below a threshold speed, for example.

In some instances, decisions regarding handover events can be based at least in part on a state of the UE and/or on a connection between the UE and a base station. For example, if a UE is in an idle state (e.g., not conducting a call or facilitating a communication), the operations can determine not to handover from a WAN to a small cell, as discussed herein, regardless of the speed of the UE. In some cases, if a UE is conducting a guaranteed bit rate communication (e.g., a voice over LTE call), the UE may not handover from the WAN to the small cell, in order to preserve a quality of the communication and/or to prevent disruptions to the guaranteed bit rate communication.

In some instances, the handover decision can be based at least in part on characteristics of the serving cell and/or on characteristics of the candidate cell. For example, characteristics of the cells can include, but are not limited to, a signal strength indicator (e.g., received signal strength indication (RSSI), received channel power indicator (RCPI), etc.), travel time measurement (e.g., time of arrival), base station capability (e.g., an amount of unused bandwidth, frequencies, channels, timeslots, etc.), signal to noise ratios (SNR), rates of changes of any of the metrics discussed herein (e.g., a rate of change of the RSSI of the serving cell compared to a rate of change of the RSSI of the candidate cell), sizes of cells (e.g., geographic coverage), Quality of Experience (QoE), Quality of Service (QoS), delay associated with channels, a type of traffic associated with the UE (e.g., voice, data, web browsing, E911, guaranteed bit rate, etc.), a parameter indicating that motion data can be considered in handover decisions associated with the cell, etc.

The systems, devices, and techniques described herein can improve a functioning of a network by reducing network congestion due to excessive handovers between WANs and small cells, for example. Further, preventing such handovers can improve a reliability of communications in a network, and/or prevent dropped calls. Further, some implementations can reduce signaling by gathering data at a same location as where the handover decision is made (e.g., at the UE, at the base station, etc.). In some cases, utilizing motion data in handover decisions can improve a QoE by improving call quality, and/or can improve a QoS by preventing dropped calls. These and other improvements to the functioning of a computer and network are discussed herein.

The systems, devices, and techniques described herein can be implemented in a number of ways. Example implementations are provided below with reference to the following figures.

Figure 1:
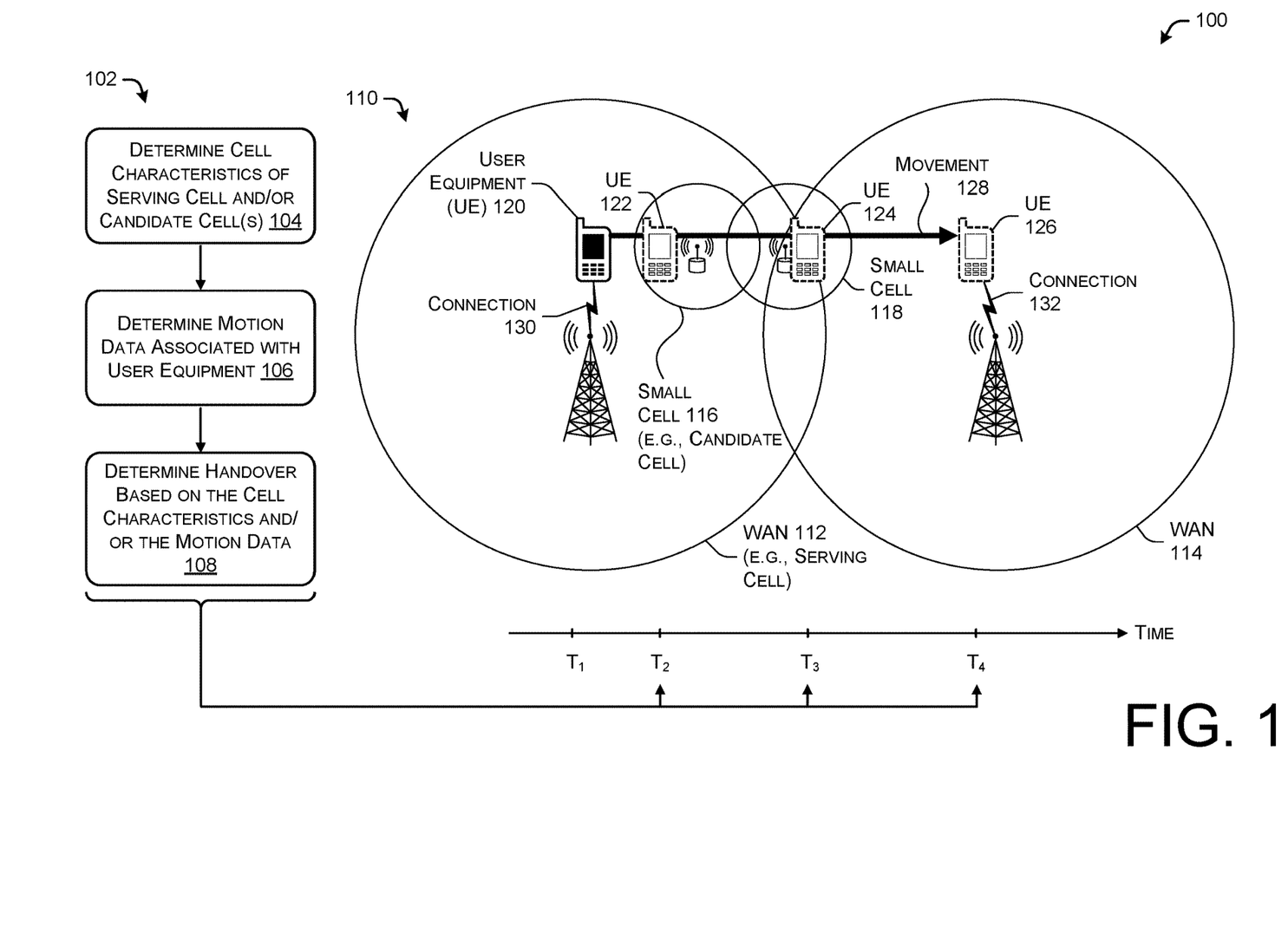
FIG. 1 illustrates a pictorial flow diagram of an example process for determining handovers in a wireless network based on cell characteristics and/or motion data.

FIG. 1 illustrates a pictorial flow diagram 100 of an example process 102 for determining handovers in a wireless network based on cell characteristics and/or motion data. In general, the process 102 includes operations 104, 106, and 108, whereby the process 102 can be performed at various times in an environment 110. For example, the operations 104, 106, and 108 can be performed at least at times $T_2$, $T_3$, and $T_4$, as discussed herein.

The environment 110 illustrates an example terrestrial network including wireless area networks (WANs) 112 and 114, and small cells 116 and 118 capable of providing wireless communications to a user equipment 120. As illustrated, the user equipment (UE) 120 represents a UE at time $T_1$, a UE 122 represents the UE at time $T_2$, a UE 124 represents the UE at time $T_3$, and a UE 126 represents the UE at time $T_4$. Motion of the UEs 120, 122, 124, and 126 is illustrated as movement 128.

At time $T_1$, the UE 120 is communicating with the WAN 112 via a connection 130. Thus, at time $T_1$, the WAN 112 can be considered to be a serving cell. At time $T_2$, the UE 122 is located within the WAN 112 and the small cell 116. Accordingly, the UE 122 can remain connected to the WAN 112 (e.g., the serving cell), but has the option of connecting to the small cell 116, which can be considered to be a candidate cell. As discussed herein, the UE 122 can determine that the serving cell (e.g., the WAN 112) and the candidate cell (e.g., the small cell 116) are available to the UE 122, in which case, the operations of the process 102 can be performed.

At 104, the operation can include determining cell characteristics of the serving cell and/or of the candidate cell(s). For example, the operation 104 can include determining a type of the serving cell and/or the candidate cell(s) (collectively referred to as the "cells"), such as determining whether the cells are 2G, 3G, 4G, or 5G cells. Further, the operation 104 can include determining a signal strength associated with the cells (e.g., RSSI, RCPI, etc.), a signal to noise ratio (SNR), delay, traffic (e.g., available number of channels, timeslots, etc.). The operation 104 can include determining whether the cells are a WAN or a small cell. In some instances, the operation 104 can include receiving an identifier or parameter associated with the cells indicating that motion data can be considered in determining whether to initiate a handover event between the serving cell and the candidate cell(s). The operation 104 can include receiving an indication of a threshold speed, above which a handover event may not occur. As can be understood in the context of this disclosure, the operation 104 can include determining cell characteristics for any number of cells. For example, there can be one or more candidate cells that are available to the UE at any particular time, that can be provide a connection to the UE to facilitate communication to and from the UE.

At 106, the operation can include determining motion data associated with the user equipment. For instance, the operation 106 can include determining an instantaneous speed of the UE (e.g., the UE 122 at time $T_2$), an average speed of the UE (e.g., an average speed of the UE 122 between time $T_1$ and $T_2$, an average speed of the UE 122 associated with a sliding time window, etc.), or other indications of motion associated with the UE (e.g., timing advance analysis, a rate of change of candidate cell(s) exposed to the UE over time, a number of handovers occurring in a period of time, etc.). In some instances, the motion data can be determined directly by the UE (e.g., via GPS data, accelerometer data, received from an external sensor coupled with the UE (e.g., a speedometer of a vehicle in communication with the UE), etc.), or indirectly (e.g., via timing advance or signals analysis, handover counts, etc.).

At 108, the operation can include determining a handover based on the cell characteristics and/or the motion data. For example, the operation 108 can include a handover decision (e.g., at time $T_2$) to initiate or prevent a handover between the WAN 112 and the small cell 116 based on the characteristics of the cells (e.g., the serving cell representing a WAN and the candidate cell representing a small cell) and/or the motion data of the UE. For example, the characteristics of the cell can include a frequency of the wireless signal provided by the cell. In some example, the small cell 116 can represent a millimeter wave cell, while the WAN 112 can represent a lower frequency of wireless signal. Further, the operation 108 can include determining that the relative or absolute signal strength indications associated with the serving cell and/or the candidate cell(s) indicate that the UE can handover to the candidate cell (in the absence of considering motion data). That is, the operation 108 can include determining or evaluating heuristics indicating a handover can occur from the serving cell to the candidate cell. However, as discussed herein, the operation 108 can include evaluating motion data which can prevent a handover which otherwise can occur, based on evaluating QoE or QoS alone.

As can be understood in the context of this disclosure, the process 102 can be performed repeatedly as the UE 120 traverses through the environment 110, represented by the movement 128. Thus, at time $T_1$, the WAN 112 can correspond to the serving cell and the small cell 116 can correspond to the candidate cell. At a time between $T_2$ and $T_3$, for example, the UE can be located in an area where candidate cells can include the small cell 116 and the small cell 118. In such a case, the process 102 can include determining cell characteristics of the small cell 116 and the small cell 118 as the candidate cells.

At time $T_3$, the UE 124 can be located in the environment 110 such that the WAN 112 can correspond to the serving cell, while the small cell 118 and the WAN 114 can correspond to candidate cells. As can be understood, the process 102 can include determining cell characteristics, determining motion data of the UE (e.g., the UE 124), and determining a handover based on the cell characteristics and/or the motion data. In one example, as motion data of the UE 124 can include speed data that is above a threshold speed, for example, the operation 108 can include determining a handover from the WAN 112 to the WAN 114 (e.g., instead of a handover from the WAN 112 to the small cell 118). Accordingly, and as illustrated at time $T_4$, the WAN 114 can provide a connection 132 to the UE 126, such that the WAN 114 can correspond to a serving cell.

In some instances, basing handover decisions at least in part on motion data can reduce a number of handovers when a UE is moving at a rate higher than a threshold value. For example, traversing the environment 110 can include handovers between the WAN 112, the small cell 116, the small cell 118, and the WAN 114. In a simplified example (e.g., not considering motion data), there could be three handovers (e.g., WAN 112→small cell 116, small cell 116→small cell 118, and small cell 118→WAN 114). However, in a case where the motion data of the UE indicates that a handover may not be initiated to the small cells 116 and 118, the process 102 can ultimately represent one handover between the WAN 112 and the WAN 114. As can be understood in the context of this disclosure, any number of handovers can occur, and in any order, based at least in part on the path of the UE 120 over time, motion data of the UE 120 over time, characteristics of the cell relative to the UE 120 over time, and the like. Thus, the process 102 can provide a flexible framework to facilitate handovers for continuous and efficient communications in the environment 110.

In one example, where a UE is stationary or below a speed threshold in a small cell acting as a serving cell for the UE, in a case where motion data indicates that the speed of the UE is above a threshold speed, the operations can determine to handover the UE to a WAN candidate cell, despite the small cell providing a higher signal strength indication, QoE, QoS, etc., relative to the WAN. These and other examples are contemplated within the scope of this disclosure.

In accordance with various embodiments described herein, the terms "user equipment (UE)," "wireless communication device," "wireless device," "communication device," "mobile device," and "client device," can be used interchangeably herein to describe any UE (e.g., the UE 120, 122, 124, or 126) that are capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 120, 122, 124, or 126 can be implemented as any suitable type of computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), desktop computer, and the like.

In general, a user can utilize the UE 120, 122, 124, or 126 to communicate with other users and associated UEs via an IP Multimedia Subsystem (IMS) core (sometimes referred to as the "IMS core network," the "IMS network," the "Core Network (CN)," or the "IM CN Subsystem"). IMS is an architectural framework defined by the $3^{rd}$ Generation Partnership Project (3GPP) for delivering Internet Protocol (IP) multimedia to a UE, such as the UE 120, 122, 124, or 126. The IMS core can be maintained and/or operated by one or more service providers, such as one or more wireless carriers ("carriers"), that provide IMS-based services to users who are associated with UEs, such as the UE 120, 122, 124, or 126. For example, a service provider can offer multimedia telephony services that allow a user to call or message other users via the IMS core using his/her UE. A user can also utilize an associated UE to receive, provide, or otherwise interact with various different IMS-based services by accessing the IMS core. In some instances, the WAN 112, 114 and the small cells 116 and 118 can represent base stations associated with an IMS network to initiate and facilitate communications. It is to be appreciated that any number of base stations and/or IMS nodes can be include in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

The UE 120, 122, 124, or 126 are configured to utilize various radio access networks (RANs) represented by the WAN 112, 114 and the small cells 116 and 118 in order to access the IMS core. In general, the IMS core is agnostic to the access technology that is used to connect a UE to the IMS core. In this manner, the UE 120, 122, 124, or 126 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 120, 122, 124, or 126 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP. The environment 110 can include any number and type of base stations representing any number and type of macrocells, microcells, picocells, or femtocells, for example, with any type or amount of overlapping coverage or mutually exclusive coverage.

Figure 2:
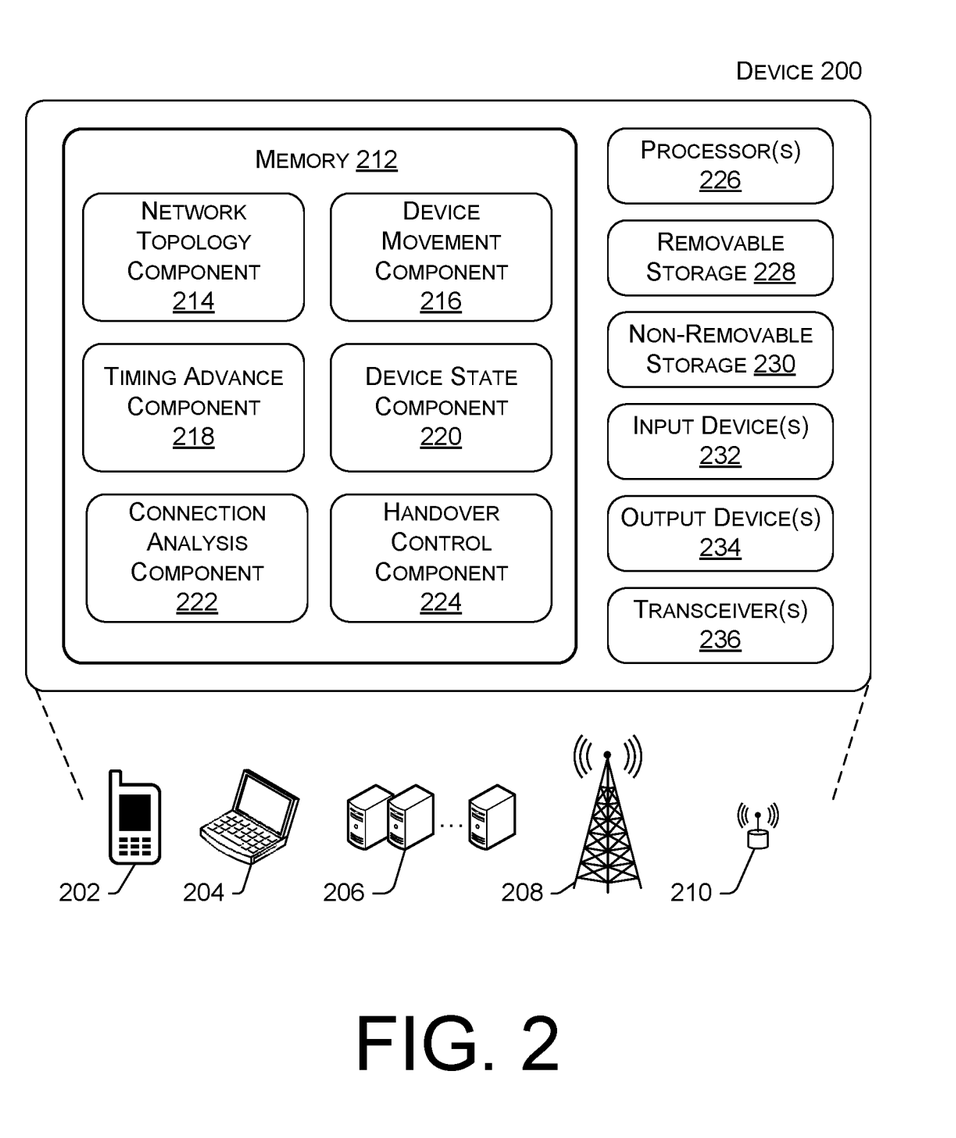
FIG. 2 illustrates an example device, such as a user equipment and/or base station(s), to implement the improved handovers based on motion data, as described herein.

FIG. 2 illustrates an example device 200, such as a user equipment and/or base station(s), to implement the improved handovers based on motion data, as described herein. In some embodiments, the device 200 can correspond to the UE 120, 122, 124, and 126, the WANs 112 and 114, or the small cells 116 and 118. In any event, some or all of the functionality discussed in connection with FIG. 1 can be implemented in the device 200. Further, the device 200 can be implemented as any one of a smartphone 202, a laptop computer 204, a server computer 206, a WAN 208, a small cell 210, and the like. It is to be understood in the context of this disclosure that the device 200 can be implemented as a single device or as a plurality of devices with components and data distributed among them.

As illustrated, the device 200 comprises a memory 212 storing a network topology component 214, a device movement component 216, a timing advance component 218, a device state component 220, a connection analysis component 222, and a handover control component 224 to provide functionality to the device 200 to facilitate improved wireless handovers based on device movement, as described herein. Also, the device 200 includes processor(s) 226, a removable storage 228 and non-removable storage 230, input device(s) 232, output device(s) 234, and transceiver(s) 236.

In some embodiments, the network topology component 214 can include functionality to maintain topology information of a network. For example, the network topology component 214 can include a database with identifiers associated with various cells in the network, physical relationships between cells, and/or geographic descriptions of the various cell. In some instances, an identifier stored by the network topology component 214 can include an indication of the wireless technology utilized by a cell, such as whether the cell is a 2G, 3G, 4G, or 5G cell. In some instances, the physical relationships between cells can include indications that a first cell is adjacent to a second cell, and the like. Further, the physical relationship information can include information defining a cell as a WAN, and can include information that the WAN is an umbrella cell with a least a portion of overlapping coverage with various small cells. Further, the network topology component 214 can include location information associated with the various base stations, which can be used to triangulate a position and/or to determine motion data of the UE in contact with the various cells. The network topology component 214 can further store information associated with geographical boundaries of cells, such as a width of the cell.

In some cases, as when implemented in a base station or network device, the network topology component 214 can receive a request for network topology information (e.g., from a UE) and provide network topology information to various requesting UEs. In some cases, as when implemented in a UE, the network topology component 214 can store information received from a network device and/or can collect and/or store usage information determined by the UE (e.g., a received signal strength associated with a particular cell, a determination of QoS associated with a particular cell, etc.), historical handover information (e.g., information indicating cells involved in a handover event and network conditions present at the time of the handover, etc.), and the like.

In some embodiments, the device movement component 216 can include functionality to determine motion data associated with a UE and/or to transmit the motion data to an entity or device responsible for the handover decision, if applicable. For example, the device movement component 216 can include one or more sensors including but not limited to, GPS sensors, accelerometers, barometers, light sensors, thermometers, etc., which can provide direct or indirect information regarding motion of the UE. In some cases, for example, when implemented in the UE, the device movement component 216 can receive one or more indications from base stations as they become visible to the UE. Based on a known distance between base stations (e.g., based on the network topology component 214), and/or based on an expected transmission range of various base stations, the device movement component 216 can determine, estimate, or infer movement based on various wireless signals becoming visible to the UE and losing connection or contact with the UE.

As can be understood in the context of this disclosure, in a case where the device movement component 216 is implemented in a UE, the UE can determine the motion data associated with the UE and can utilize the motion data in determining whether to transmit a handover request to a base station requesting a handover. In one example, the device movement component 216 can determine motion data associated with the UE, and can transmit the motion data to the base station, for example, where the base station can make a handover decision based at least in part on the motion data.

In some instances, the device movement component 216 can further include functionality to determine whether a speed of the UE is above a speed threshold that is associated with a particular cell. In some cases, a speed threshold of a cell can be based at least in part on a size of the cell (e.g., WAN, microcell, microcell, femtocell, picocell, small cell, etc.), a type of wireless communication (e.g., 2G, 3G, 4G, 5G, etc.), a number and/or type of neighboring cells, an amount of time associated with the handover event (e.g., an amount of time to handover from a serving cell to a candidate cell), and the like. In some instances, a UE can receive an indication of the threshold speed in connection with determining whether to handover to a candidate cell.

In some embodiments, the timing advance component 218 can include functionality to determine a timing advance associated with a length of time a signal takes to reach a base station from a UE. For example, in some cases, as when the UE is connected to a serving cell and is visible to two candidate cells, the timing advance component 218 can determine a timing advance associated with the various signals, and based at least in part on a known location of the base stations, the timing advance component 218 can triangulate a location of the UE. In some instances, as the timing advance for the various signals changes over time, the timing advance component 218 can determine motion data associated with the UE. When implemented at a base station, for example, the timing advance component 218 can receive a transmission from a UE, determine the propagation delay associated with the transmission, and provide an indication of the delay to the UE for subsequent transmission and/or to determine motion data.

In some embodiments, the device state component 220 can include functionality to determine a state of communications associated with the UE. For example, states of the UE can include at least idle and active states. For example, in an idle state, the UE is not conducting a communication, although the UE can be associated with a cell which can route a communication to the UE when requested. In an active state, the UE is conducting a communication. In some instances, when a UE is in an idle mode, the UE can identify a WAN to connect to in the event a call is to be established. In some cases, if motion data associated with the UE indicates that a speed of the UE is above a threshold, for example, and the UE can select between the WAN and a small cell utilizing millimeter wavelengths, the device state component 220 can, in part, control the UE to utilize the WAN as a serving cell in any subsequent communications.

In some embodiments, the connection analysis component 222 can include functionality to analyze a connection (e.g., the connection 130) between the UE and a serving cell (e.g., the UE 122 and the WAN 112) and/or a connection between the UE and a candidate cell (e.g., the UE 122 and the small cell 116). In some instances, the connection analysis component 222 can determining an RSSI, RCPI, etc. associated with the connection, a SNR associated with the connection, etc. In some instances, the connection analysis component 222 can determine that the UE is involved in a guaranteed bit rate (GBR) connection, a voice call, exchanging SMS/MMS messages, web browsing, streaming video, etc. In some implementations, the connection analysis component 222 can prevent a handover based on the UE being engaged in a GBR connection and/or based on motion data associated with the UE, as discussed herein. In some instances, a handover decision can be made based at least in part on an amount of data associated with a connection. For example, a connection including streaming video can be more likely to handover to the small cell, which can provide a higher bandwidth than the WAN. In another example, a connection including streaming video can be more likely to prevent a handover to a small cell, in order to preserve the status of the connection.

In some embodiments, the handover control component 224 can include functionality to determine, in the event a handover is to be initiated, whether the handover is to be a soft handover or a hard handover. For example, determining whether to use a soft handover can be based at least in part on a type of network or base stations involved in the handover, as it can be understood that certain networks (e.g., LTE networks) may not support soft handovers. However, it can be understood that when operating in particular networks (e.g., CDMA networks) that soft handovers can be utilized. It can be understood in the context of this disclosure that a soft handover represents a handover procedure whereby radio links are added or removed to and from the UE such that there is at least one radio link connected to the UE. In some cases, soft handovers can be referred to as "make before break" handovers. In the case of hard handovers, a connection to a UE is broken and reestablished in quick succession (e.g., "break before make"). In any event, the handover control component 224 can function to provide near-instantaneous and seamless handovers between a serving cell and a candidate cell, as discussed herein.

Further, the handover control component 224 can include functionality to determine whether a handover is to occur between a serving cell and one or more candidate cells. For example, the handover control component 224 can base a handover decision on factors including, but not limited to, serving cell characteristics, candidate cell characteristics, motion data associated with the UE, timing advances associated with the UE, a state of the UE, an analysis of the connection between the UE and a serving cell, and the like. In some instances, the handover control component 224 can be implemented in a UE as an access network discovery and selection function (ANDSF).

In various embodiments, the memory 212 is volatile (such as RAM), non-volatile (such as ROM, flash memory, etc.) or some combination of the two. The network topology component 214, the device movement component 216, the timing advance component 218, the device state component 220, the connection analysis component 222, and the handover control component 224 stored in the memory 212 can comprise methods, threads, processes, applications or any other sort of executable instructions. The network topology component 214, the device movement component 216, the timing advance component 218, the device state component 220, the connection analysis component 222, and the handover control component 224 can also include files and databases.

In some embodiments, the processor(s) 226 is a central processing unit (CPU), a graphics processing unit (GPU), or both CPU and GPU, or other processing unit or component known in the art.

The device 200 also includes additional data storage devices (removable and/or non-removable) such as, for example, magnetic disks, optical disks, or tape. Such additional storage is illustrated in FIG. 2 by removable storage 228 and non-removable storage 230. Tangible computer-readable media can include volatile and nonvolatile, removable and non-removable media implemented in any method or technology for storage of information, such as computer readable instructions, data structures, program modules, or other data. Memory 212, removable storage 228 and non-removable storage 230 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The device 200 also can include input device(s) 232, such as a keypad, a cursor control, a touch-sensitive display, voice input device, etc., and output device(s) 234 such as a display, speakers, printers, etc. These devices are well known in the art and need not be discussed at length here.

As illustrated in FIG. 2, the device 200 also includes one or more wired or wireless transceiver(s) 236. For example, the transceiver(s) 236 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 236 can utilize multiple-input/multiple-output (MIMO) technology. The transceiver(s) 236 can comprise any sort of wireless transceivers capable of engaging in wireless, radio frequency (RF) communication. The transceiver(s) 236 can also include other wireless modems, such as a modem for engaging in Wi-Fi, WiMAX, Bluetooth, or infrared communication.

Figure 3:
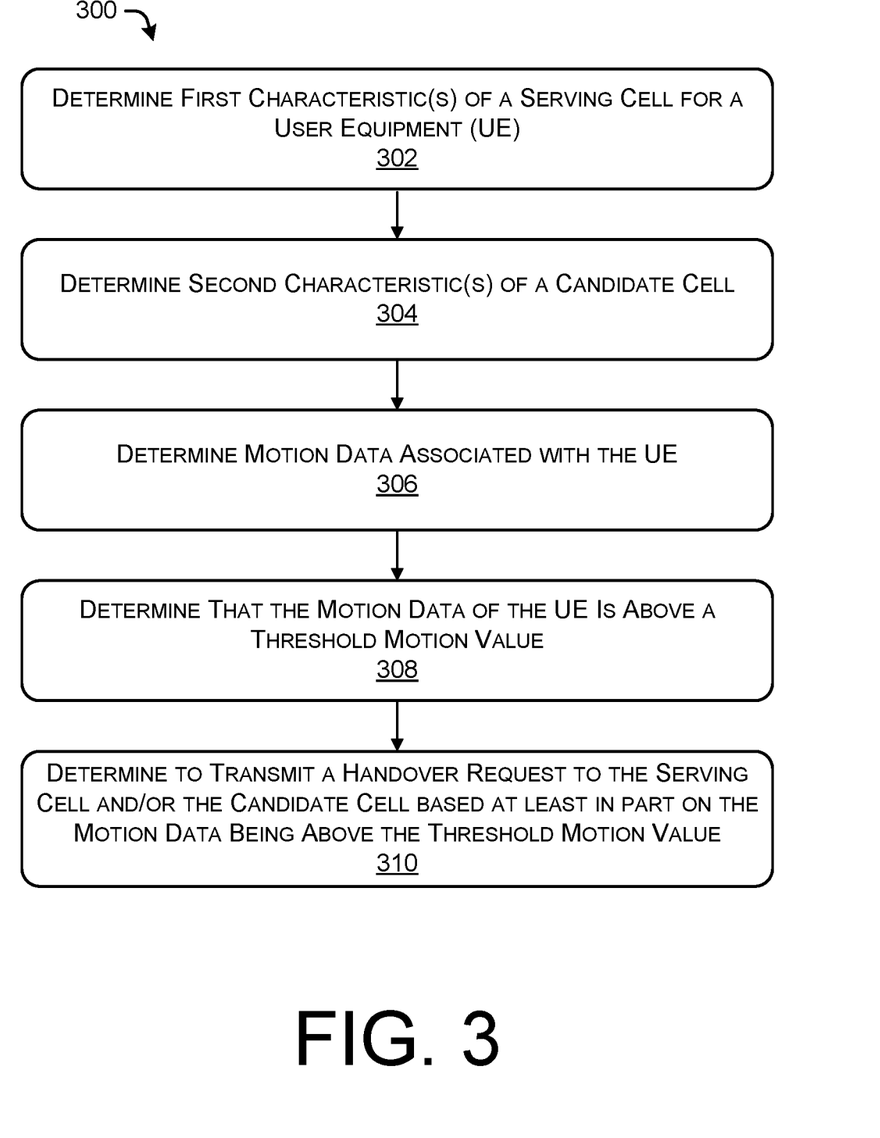
FIG. 3 illustrates an example process for determining handover event(s) at a user equipment based on cell characteristics and/or motion data.
Figure 4:
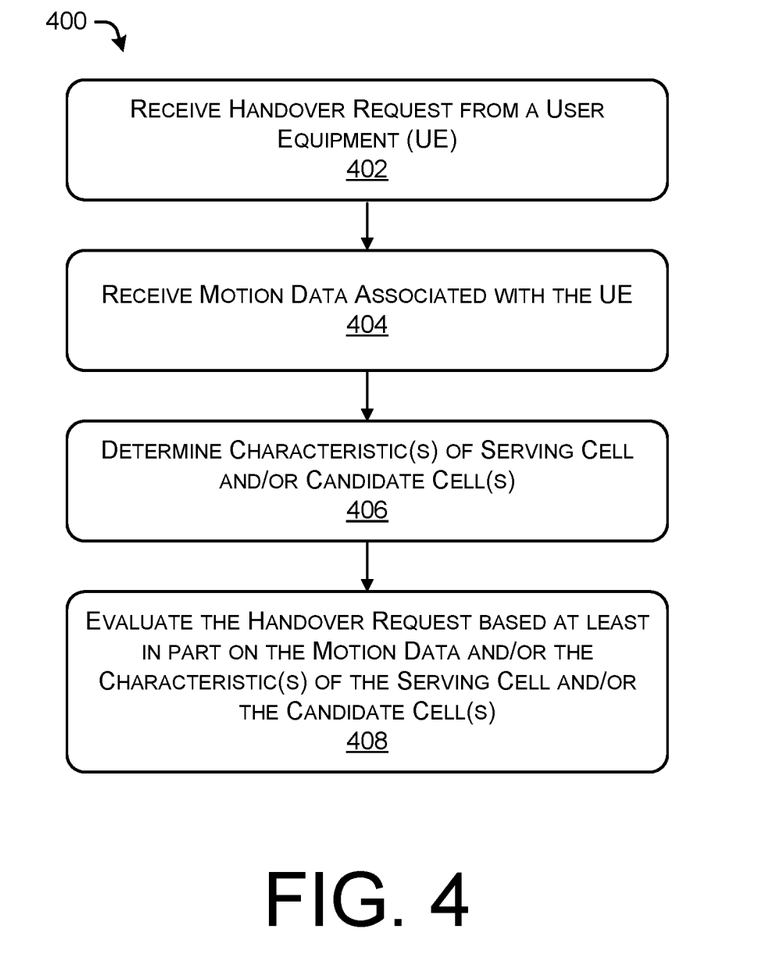
FIG. 4 illustrates an example process for determining handover event(s) at a base station based on cell characteristics and/or motion data.
Figure 5:
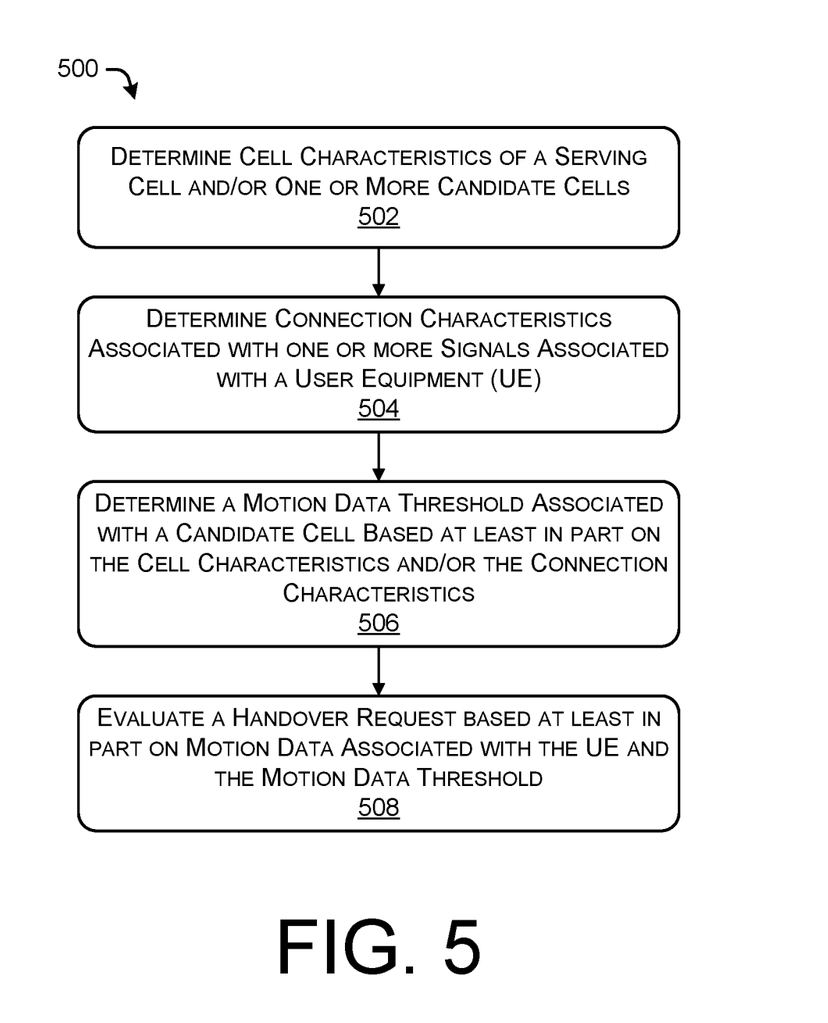
FIG. 5 illustrates an example process for determining a motion data threshold associated with determining handover event(s).

FIGS. 3-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process 300 for determining handover event(s) at a user equipment based on cell characteristics and/or motion data. The example process 300 can be performed by the UE 120, 122, 124, 126, 200, 202, or 204, for example. Some or all of the process 300 can be performed by one or more devices in the environment 110, for example.

At operation 302, the process can include determining one or more first characteristics of a serving cell for a user equipment (UE). As discussed herein, the serving cell can include a base station that is providing a connection to the UE for facilitating a communication between the UE and other UEs or devices on a network. In some instances, when the UE is in an idle mode, the serving cell can corresponding to the cell that the UE is associated with and that will facilitate a communication when one is initiated. In some examples, characteristics of the serving cell can include, but are not limited to, an RSSI associated with a connection, a type of wireless technology utilized by the serving cell (e.g., 2G, 3G, 4G, 5G, etc.), a frequency of wireless signal provided by the serving cell, a geographical size of the serving cell, a location of the base station associated with the serving cell, a transmission power of the serving cell, total or unused bandwidth or capacity of the serving cell, parameters indicating whether motion data can be considered in handovers associated with the serving cell, a speed threshold for evaluating a speed of UE in connection with the candidate cell, a cell identifier, numbers and types of neighboring cells, services supported by the serving cell, a timing advance associated with the serving cell, etc. In some instances, the operation 302 can include the UE requesting the first characteristics of the serving cell, and in some instances, the operation 302 can include receiving the first characteristics from the serving cell or another network device.

At operation 304, the process can include determining one or more second characteristics of a candidate cell. As discussed herein, the candidate cell can correspond to cells that are capable of providing a connection to a UE to facilitate a wireless communication. In some instances, characteristics of the candidate cell can include, but are not limited to, an RSSI associated with a signal received from the candidate cell, a type of wireless technology utilized by the candidate cell (e.g., 2G, 3G, 4G, 5G, etc.), a frequency of wireless signal provided by the candidate cell, a geographical size of the candidate cell, a location of the base station associated with the candidate cell, a transmission power of the candidate cell, total or unused bandwidth or capacity of the candidate cell, parameters indicating whether motion data can be considered in handovers associated with the candidate cell, a speed threshold for evaluating a speed of UE in connection with the candidate cell, a cell identifier, numbers and types of neighboring cells, services supported by the candidate cell, etc. In some instances, the operation 304 can include the UE requesting the second characteristics of the candidate cell, and in some instances, the operation 304 can include receiving the second characteristics from the candidate cell or another network device.

At operation 306, the process can include determining motion data associated with the UE. In some instances, the operation 306 can include monitoring one or more sensors of the UE, such as a GPS sensor and/or an accelerometer, to determine motion data associated with the UE. In some instances, the operation 306 can include monitoring motion data over time to perform statistical operations on the motion data (e.g., to determine an average speed, maximum speed, etc.). In some instances, the operation 306 can include receiving one or more indications of motion data from a network device connected to the UE or in communication with the UE (e.g., from one or more of the serving cell or the candidate cell(s)), for example. In some instances, the operation 306 can include determining that a number of handovers has occurred within a time period, and/or determining that the number of handovers is above a threshold number of handovers. In some instances, the operation 308 can include receiving an indication of motion data determined via one or more timing advances associated with signals received by various base stations.

At operation 308, the process can include determining that the motion data of the UE is above a threshold motion value. For example, the operation 308 can include determining that an instantaneous speed of the UE is above a threshold speed. Further, the operation 308 can include determining that an average speed of the UE is above a threshold average speed associated with a period of time. In some instances, the operation 308 can include determining that the instantaneous speed is below a threshold speed and that the average speed is above a threshold.

At operation 310, the process can include determining whether to transmit a handover request to the serving cell and/or to the candidate cell based at least in part on the motion data being above the threshold motion value. For example, in a case where an analysis of the first characteristics and/or the second characteristics indicates that the UE would be better served by the candidate cell instead of the serving cell (e.g., because of signal strength, congestion characteristics, bandwidth availability, etc.), the operation 310 can determine that a handover may not be initiated, and the operation 310 can include refraining from transmitting a handover request to the serving cell and/or to the candidate cell. Accordingly, the UE can remain connected to the serving cell.

FIG. 4 illustrates an example process 400 for determining handover event(s) at a base station based on cell characteristics and/or motion data. The example process 400 can be performed by the WANs 112, 114, the small cells 116, 118, and the devices 200, 208, and 210, for example. Some or all of the process 400 can be performed by one or more devices in the environment 110, for example.

At operation 402, the process can include receiving a handover request from a user equipment. For example, the UE can determine that a candidate cell visible to the serving cell would better serve the UE (e.g., based on signal strength, bandwidth, available capability, etc.), and in response, the UE can transmit a request to initiate a handover to the serving cell, the candidate cell, and/or another network device. In some examples, a network device (e.g., a base station) can determine that a candidate cell would better serve the UE, and in response, can determine that a handover opportunity is present with respect to the UE and one or more candidate cells.

At operation 404, the process can include receiving motion data associated with the UE. In some examples, the UE can determine motion data and can provide an indication of the motion data to the serving cell, the candidate cell, and/or another network device. In some cases, the operation 404 can include requesting motion data from a UE. In some cases, the operation 404 can include determining motion data based on timing advance(s) and/or based on visibility of the UE to other base stations.

At operation 406, the process can include determining characteristics of the serving cell and/or the candidate cells. For example, the operation 406 can include determining a signal strength associated with a connection between the UE and the serving cell and/or the candidate cell. In some instances, the operation 406 can include determining that the serving cell is a WAN and that the candidate cell is a small cell. In some instances, the operation 406 can include determining any characteristics of the serving cell and/or the candidate cell(s), as discussed herein.

At operation 408, the process can include evaluating the handover request based at least in part on the motion data and/or the characteristics of the serving cell and/or the candidate cell(s). For example, the operation 408 can include determining whether the respective signal strengths associated with the serving cell and/or the candidate cell(s) indicate that a handover can be initiated with respect to one of the candidate cells. Further, the operation 408 can include determining whether the motion data indicates a speed of the UE is above a threshold speed associated with one or more of the candidate cells. In some cases, when a signal strength indicates that a handover request can be granted to handover the UE from a WAN serving cell to a small cell candidate cell, and a speed of the UE is above a threshold speed, the operation 408 can include denying the handover request resulting in the UE remaining in communication with the serving cell. In some instances, when signal strength of a serving cell is below a threshold value, and the speed of the UE is above a threshold speed, the operation 408 can grant the handover request to prevent losing a connection with the UE. In some instances, the operation 408 can include determining a threshold speed associated with the candidate cell based at least in part on the type of candidate cell, frequency of wireless communications provided by the candidate cell, signal strength of the serving cell and/or candidate cell (e.g., if a signal strength of the serving cell is low the threshold speed can be increase, effectively allowing faster-moving UEs to connect to a candidate cell, and vice versa), a size of the candidate cell (e.g., bigger candidate cells can be associated with a bigger threshold speed, and vice versa), and the like.

FIG. 5 illustrates an example process 500 for determining a motion data threshold associated with determining handover event(s). The example process 500 can be performed by the UE 120, 122, 124, 126, 202, or 204, the WANs 112, 114, or 208, the small cells 116, 118, or 210, or the devices 200 or 206, for example, for example. Some or all of the process 500 can be performed by one or more devices in the environment 110, for example.

At operation 502, the process can include determining cell characteristics of a serving cell and/or one or more candidate cells. For example, characteristics of cells can include, but are not limited to, one or more of an RSSI, RCPI, etc., associated with a cell (e.g., of a signal received by the UE or received by the cell from the UE), a type of wireless technology utilized by the cell (e.g., 2G, 3G, 4G, 5G, etc.), a frequency of wireless signal provided by the cell, a geographical size of the cell, a location of the base station associated with the cell, a transmission power of the cell, total or unused bandwidth or capacity of the cell, a cell identifier, numbers and types of neighboring cells, services supported by the cell, a timing advance associated with the serving cell, etc.

At operation 504, the process can include determining connection characteristics associated with one or more signals associated with a UE. For example, the operation 504 can include determining a first RSSI (or strength indicator) of a first signal received by the UE from a serving cell and/or a second RSSI (or strength indicator) of a second signal received by the UE from a candidate cell. In some instances, the connection characteristics can further include, but are not limited to, a signal to noise (SNR) ratio, a type of communication (e.g., guaranteed bit rate, short message service/multimedia messaging service (SMS/MMS), web browsing, streaming video, voice call, E911, etc.), a requested bandwidth associated with the communication, and the like.

At operation 506, the process can include determining a motion data threshold associated with a candidate cell based at least in part on the cell characteristics and/or the connection characteristics. For example, the motion data threshold can be based at least in part on a RSSI (or strength indicator, in general) of the signal received by the UE from the serving cell (e.g., the serving cell RSSI) being below a threshold RSSI value. That is, if the serving RSSI is low, indicating a relatively weak signal to the UE, the motion data threshold can be increased, thereby increasing a speed, for example, that the UE can travel and still initiate a handover to a candidate cell. In some instances, the motion data threshold can be based at least in part on a RSSI of the signal received by the UE from the candidate cell (e.g., the candidate cell RSSI) being above a threshold value. For example, if the candidate cell RSSI is above a threshold, the motion data threshold can be increased. In some instances, the motion data threshold can be based at least in part on a relative difference between the serving cell RSSI and the candidate cell RSSI (e.g., a higher relative difference can increase or decrease the threshold). In one example, the motion data threshold can be based at least in part on a size of the candidate cell. For example, as a size of the candidate cell increases, the motion data threshold can increase. In some instances, the motion data threshold can be based at least in part on a frequency of the wireless signal. For example, as the frequency increases, a motion data threshold can decrease.

Of course, the various examples given herein are examples and are not intended to limit the scope of the claims. The descriptions of performing or not performing actions with respect to values being "above a threshold" or "below a threshold" can be implemented in either case, as can be understood. For example, just as a speed being above a threshold value can prevent a handover from being initiated, a speed being below a threshold value can initiate a handover. Similarly, in some implementations various factors can increase a threshold value, in some implementations, those various factors can decrease a threshold value. Thus, handover decisions can be based on a variety of factors, depending on the implementations, as discussed herein.

At operation 508, the process can include evaluating a handover request based at least in part on motion data associated with the UE and the motion data threshold. In some instances, the operation 508 can be performed at the UE, the serving cell, the candidate cell, or another network device, as discussed herein. Further, the operation 508 can include transmitting the motion data threshold (or an indication of the motion data threshold) to an entity for evaluating a handover decision, as discussed herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
determining a first characteristic of a serving cell, the serving cell connected to a user equipment (UE) and configured to facilitate a communication with the UE, the first characteristic including at least a first strength indicator associated with a first signal received at the UE from the serving cell, wherein the serving cell is a wide area network;
determining a second characteristic of a candidate cell, the second characteristic including at least a second strength indicator associated with a second signal received at the UE from the candidate cell, wherein the candidate cell is a small cell using a millimeter wavelength for wireless transmissions;
determining a third characteristic of the candidate cell, the third characteristic including at least a frequency used by the candidate cell, wherein the third characteristic indicates a size of a coverage area of the candidate cell;
determining one or more congestion characteristics associated with the candidate cell, wherein the one or more congestion characteristics include an amount of unused bandwidth of the candidate cell;
determining that a handover event can be initiated based at least in part on the second strength indicator being higher than the first strength indicator;
determining, based at least in part on timing advance data associated with one or more signals transmitted by the UE, motion data associated with the UE, the motion data including at least an instantaneous speed of the UE and an average speed of the UE associated with a time period;
determining, at a time the UE is connected to the serving cell, a state of the UE from at least an active state that indicates that the UE is facilitating the communication and an idle state that indicates that the UE is not facilitating the communication; and
determining the handover event based on the instantaneous speed being below a threshold speed value and the average speed being above a threshold average speed value, the state of the UE being the idle state, the one or more congestion characteristics, and on the frequency used by the candidate cell.

2. The system of claim 1, the operations further comprising determining a number of handover requests over a time period; and wherein determining the motion data associated with the UE is based, at least in part, on the number of handover requests.

3. The system of claim 1, the operations further comprising receiving an indication associated with the candidate cell that the motion data is to be evaluated when determining a handover to the candidate cell.

4. A device comprising:
one or more processors;
a memory; and
one or more components stored in the memory and executable by the one or more processors to perform operations comprising:
determining a first characteristic of a serving cell connected to the device and configured to facilitate a communication of the device, the serving cell including a wide area network;
determining a second characteristic of a candidate cell, the second characteristic including at least a frequency used by the candidate cell, wherein the second characteristic indicates a size of a coverage area of the candidate cell, the candidate cell including a small cell configured to transmit and receive millimeter wavelength wireless communications;
determining one or more congestion characteristics associated with the candidate cell, wherein the one or more congestion characteristics include an amount of unused bandwidth of the candidate cell;
determining, based at least in part on timing advance data associated with one or more signals transmitted by the device, motion data associated with the device, wherein the motion data includes an instantaneous speed of the device and an average speed of the device associated with a time period;
determining, at a time the device is connected to the serving cell, a state of the device, wherein the state of the device is at least one of an active state that indicates that the device is conducting the communication or an idle state that indicates that the device is not within the communication; and determining a handover event based on the first characteristic, the second characteristic, the one or more congestion characteristics, the state of the device, the instantaneous speed being below a threshold speed value, and the average speed being above a threshold average speed value.

5. The device of claim 4, the operations further comprising:
determining that a first signal strength associated with the candidate cell is higher than a second signal strength associated with the serving cell;
determining that the motion data is above at least one of the threshold speed value or the threshold average speed value; and
refraining from transmitting a handover request to the candidate cell.

6. The device of claim 4, the operations further comprising:
determining that a first signal strength associated with the candidate cell is higher than a second signal strength associated with the serving cell; and
determining that the motion data is below at least one of the threshold speed value or the threshold average speed value, wherein determining the handover event includes transmitting a handover request to the candidate cell to initiate a handover from the serving cell to the candidate cell.

7. The device of claim 4, wherein at least one of the threshold speed value or the threshold average speed value is based at least in part on a transmission power associated with the candidate cell.

8. The device of claim 4, wherein a first geographic coverage of the serving cell at least partially overlaps with a second geographic coverage of the candidate cell.

9. The device of claim 4, the operations further comprising determining the motion data based at least in part on GPS data associated with the device.

10. The device of claim 4, wherein the motion data further comprises a number of handover requests over the time period.

11. The device of claim 4, wherein the candidate cell is a first candidate cell, wherein the wide area network (WAN) is a first WAN, and wherein the handover event is a first handover event, the operations further comprising:
determining a third characteristic of a second candidate cell, the second candidate cell including a second WAN; and
determining a second handover event based at least in part on the third characteristic and the motion data relative to at least one of the threshold speed value or the threshold average speed value, wherein the second handover event includes a handover request to initiate a handover from the serving cell to the second candidate cell.

12. A processor-implemented method comprising:
determining a first characteristic of a serving cell connected to a user equipment (UE) and configured to facilitate a communication for the UE, the serving cell including a wide area network;
determining a second characteristic of a candidate cell, the second characteristic including at least a frequency used by the candidate cell, wherein the second characteristic indicates a size of a coverage area of the candidate cell, the candidate cell including a small cell configured to transmit and receive millimeter wavelength wireless communications;
determining one or more congestion characteristics associated with the candidate cell, wherein the one or more congestion characteristics include an amount of unused bandwidth of the candidate cell;
determining, based at least in part on timing advance data associated with one or more signals transmitted by the UE, motion data associated with the UE, wherein the motion data comprises an instantaneous speed of the UE and an average speed of the UE associated with a time period;
determining, at a time the UE is connected to the serving cell, a state of the UE, wherein the state of the UE is at least one of an active state that indicates that the UE is conducting the communication or an idle state that indicates that the UE is not conducting the communication; and
determining a handover event based on the first characteristic, the second characteristic, the one or more congestion characteristics, the state of the UE, the instantaneous speed being below a threshold speed value, and the average speed being above a threshold average speed value.

13. The processor-implemented method of claim 12, further comprising:
determining that a first signal strength associated with the candidate cell is higher than a second signal strength associated with the serving cell;
determining that the motion data is above at least one of the threshold speed value or the threshold average speed value; and refraining from transmitting a handover request to the candidate cell.

14. The processor-implemented method of claim 12, further comprising:
determining that a first signal strength associated with the candidate cell is higher than a second signal strength associated with the serving cell; and determining that the motion data is below at least one of the threshold speed value or the threshold average speed value, wherein determining the handover event includes transmitting a handover request to the candidate cell to initiate a handover from the serving cell to the candidate cell.

15. The processor-implemented method of claim 12, wherein the motion data comprises and a number of handover requests over the time period.

16. The processor-implemented method of claim 12, wherein the candidate cell is a first candidate cell, wherein the wide area network (WAN) is a first WAN, and wherein the handover event is a first handover event, the processor-implemented method further comprising:
determining a third characteristic of a second candidate cell, the second candidate cell including a second WAN; and
determining a second handover event based at least in part on the third characteristic and the motion data relative to at least one of the threshold speed value or the threshold average speed value, wherein the second handover event includes a handover request to initiate a handover from the serving cell to the second candidate cell.

* * * * *